WILLIAM CULL
INVENTOR

BY Irvin S. Thompson

ATTORNEY

3,169,777
WORK HOLDING MEANS

William Cull, Sutton Coldfield, England, assignor to Birfield Engineering Limited, London, England, a company of Great Britain
Filed Aug. 28, 1962, Ser. No. 219,955
Claims priority, application Great Britain, Aug. 29, 1961, 31,014/61
9 Claims. (Cl. 279—4)

This invention relates to work holding means, and in particular to means for holding a workpiece by gripping a peripheral surface of the latter during a machining operation.

Prior forms of work holding devices such as taper collets, diaphragm chucks and the like suffer from the disadvantage that they cannot grip a workpiece having a smooth cylindrical outer surface sufficiently tightly to ensure that the workpiece cannot shift when subjected to heavy cuts during a machining operation, particularly during milling. When a high degree of accuracy for a large production run of machined components is essential, in particular if the components have to be indexed for repeated cuts, a very considerable holding force is required.

Ball chucks have been used comprising balls which grip the outer surface of a workpiece and are moved inwardly for this purpose by a conical wedging surface, but these ball chucks have suffered from the disadvantage that the reaction of the balls is borne by small point contact surface areas on the conical wedging surface, with the result that the latter becomes indented or "brinnelled" and the chuck becomes inaccurate. The object of the invention is to provide work holding means of the ball chuck type which have a sustained accuracy for relatively long periods of use.

According to the invention a work holding fixture comprises a grooved member arranged coaxially with a ball cage member adapted to receive a workpiece, a ring of balls engaging the corresponding grooves in the grooved member and retained in the cage member so that they are accurately located axially of the latter, the balls being arranged to grip a surface of the workpiece and the grooves so formed that the longitudinal axes thereof lie on a conical surface coaxial with said members, and means to produce relative axial movement of said members so that the grooves engage the balls with a wedging action to urge them away from the grooved member to the gripping position.

When intended to grip the outer surface of the workpiece the grooved member is internally grooved and forms an outer member arranged around the cage member, the balls being urged inwardly to the gripping position.

The engagement of each ball by a corresponding groove in the outer member produces a much lower surface loading spread over a greater area of the outer member for a given work-gripping force, as compared with the plain conical surface previously used in ball chucks. As a result, a fixture in accordance with the present invention enables the gripping force of the balls to be very much increased while the accuracy of the grooves is consistent over very long production runs. The grooves are preferably of elliptical cross-sectional shape, so that each ball has two areas of contact with the corresponding groove disposed respectively on the two flanks of the latter to produce two contact areas between which the reaction to the gripping force on the workpiece is shared equally. The cage member may have a central bore in which the workpiece fits with a clearance merely sufficient to enable the workpiece to be inserted, so that the workpiece is centered by the cage member before the balls exert a gripping action.

Power-operated means are preferably provided to produce said relative axial movement of the outer and cage members, and these means may comprise a fluid-operated piston and cylinder assembly.

Both members and the piston and cylinder assembly may be mounted in an indexing head which can be turned to index the workpiece for successive machining operations. Such an arrangement is conveniently used to hold the outer member of a ball type constant velocity joint while the necessary ball tracks are machined in the outer member by means of an end-milling cutter.

The invention will now be further described with reference to the accompanying drawings which illustrate, by way of example, an indexing head incorporating a work holding fixture in accordance with the invention. In the drawings.

An indexing sleeve 1 of the head is rotatably mounted in anti-friction bearings such as 2 in the body of an associated machine (indicated generally by 3) so that it can be indexed, and held in an indexed position, by means which form no part of the invention and hence will not be described herein.

Figure 3:
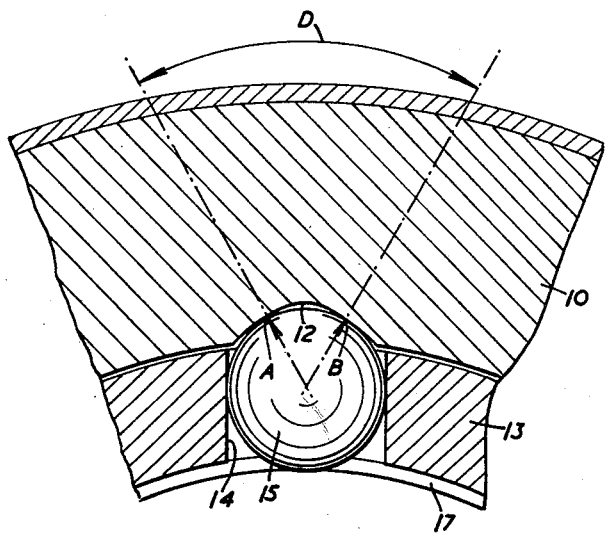
FIGURE 3 is a detail sectional view on the line III—III in FIGURE 1, also to a larger scale.

The indexing sleeve 1 is flanged at 4 at the front end and at the rear end has bolted to it by bolts such as 5 a cylinder of a piston 6 and cylinder 7 assembly forming power-operated means of the fixture. An outer member 8 of the fixture is bolted to the flange 4 by bolts such as 9 and has a forwardly projecting nose portion 10 in which is machined an equiangularly arranged series of internal grooves such as 12, shown in section in FIGURE 3. The longitudinal axis of each groove 12 is coplanar with the indexing axis, and all the groove axes lie on a conical surface coaxial with the indexing sleeve 1.

Figure 1:
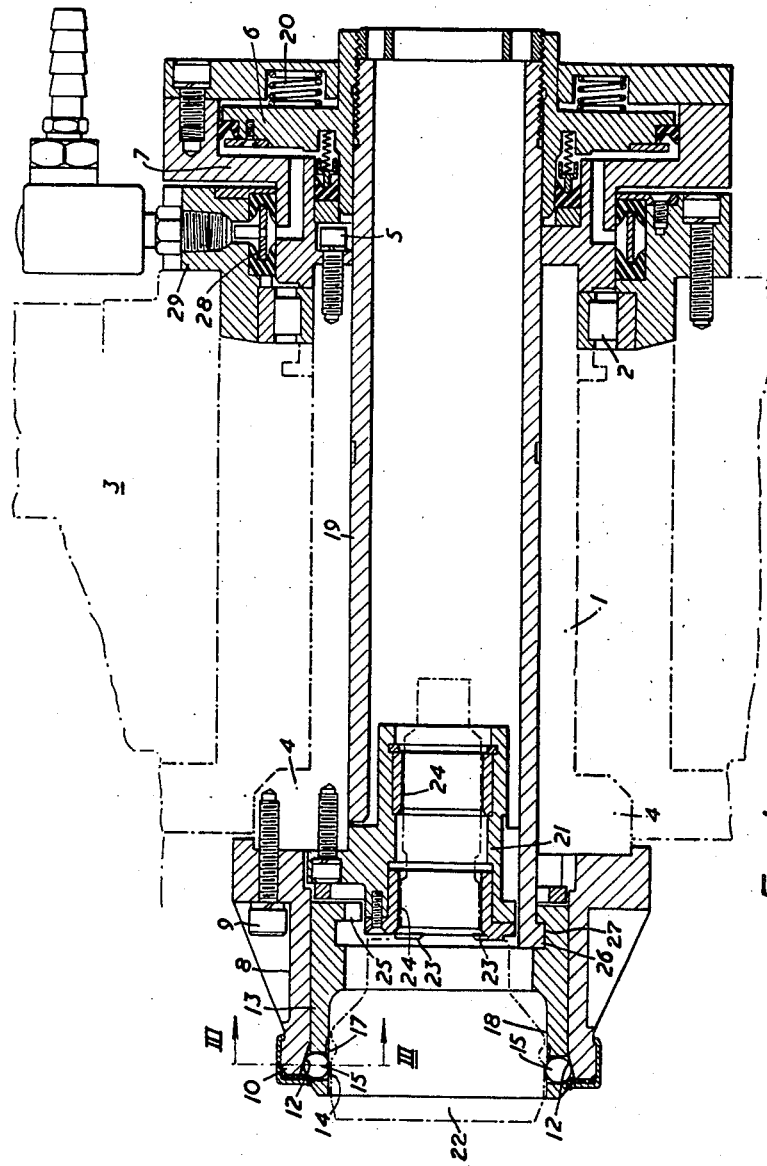
FIGURE 1 is an axial sectional view of the indexing head.
Figure 2:
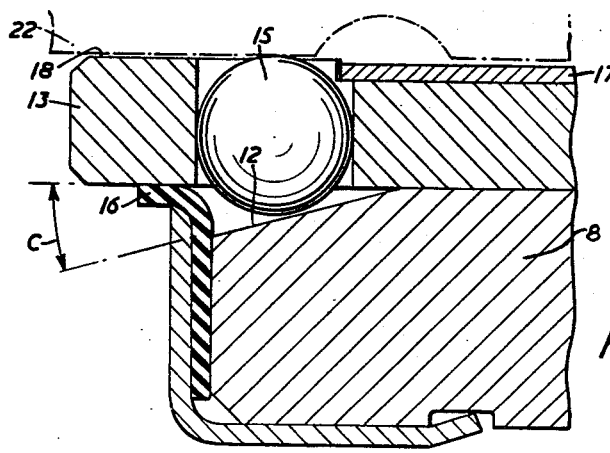
FIGURE 2 is a detail of FIGURE 1 to a larger scale.

An inner cage member 13 is a sliding fit within the outer member 8 and has a series of radial bores such as 14 in each of which a ball 15 is located. All the bores 14 are located in a common plane at right angles to the indexing axis, and each ball 15 engages in a corresponding one of the grooves 12 in the outer member 8. The grooves 12 terminate at the front end of the nose portion 10 of the outer member 8 and a lip seal 16 (see particularly FIGURE 2) is provided to prevent entry of dirt and chippings between the outer member 8 and the cage member 13. A flat annular spring 17 recessed into the axial bore 18 of the cage member 13 partly overlaps the radial bores 14 therein to retain the balls 15 and prevent them falling inwardly.

A draw sleeve 19 connected to the rear or inner end of the cage member 13 is screwed at the rear end into the piston 6 of the piston and cylinder assembly, and a ring of return springs such as 20 urge the piston 6 and hence through the sleeve 19 the cage member 13 forwardly to the free or non-gripping position. The bore 18 of the cage member 13 has just sufficient clearance with the outer cylindrical surface of the workpiece 22 to be gripped (see FIGURE 2) to enable the latter to be inserted freely, and a fixed member 21 is provided with suitable locating surfaces 23 to locate the workpiece 22 axially of the fixture.

The illustrated embodiment is designed for use to hold the outer member of a ball type constant velocity joint forming the workpiece 22 while the internal ball tracks thereof are machined. The member has a cup-shaped end section which is received in the bore 18 and a stem section which is received in locating bushes 24 which act to align the member within the fixture. The bushes 24 can be changed to suit different coupling members and are mounted in the fixed member 21.

To enable the cage member 13 also to be changed it is detachably connected to the adjacent end of the draw sleeve 19 by means of a claw coupling formed by radial claws such as 25 and 26 on these two parts. On fitting the outwardly projecting claws 26 pass between the inwardly projecting claws 25, after which relative rotation of the parts moves one set of claws behind the other to couple the two parts axially, the claws 26 being received within an internal annular groove 27 of the cage member 13 and passing through slots in the member 21.

To clamp the workpiece 22 pressure fluid is admitted to the cylinder 7 via a running seal 28 from a fixed supply head 29 and acts on the forward face of the piston 6 to move the latter rearwardly, and this draws the cage member 13 into the outer member 8. As a result the grooves 12 in the outer member 8 engage the balls 15 with a wedging action so that they are urged radially inwardly into gripping engagement with the outer surface of the workpiece 22.

An elliptical formation of the grooves 12 (see FIGURE 3) produces two spaced contact areas at A and B between each ball 15 and the corresponding groove 12, the reaction to the gripping force of the ball 15 being shared equally between the two areas. These areas are as shown respectively positioned on the flanks of the groove 12 inwardly of the edge thereof and the sharing of the load between the two areas A and B, which are themselves of elliptical shape, enables a very high gripping force to be produced without material indentation of the surface of the groove over very long production runs. It has been found that the optimum gripping effect is achieved if each groove is inclined at an angle C (see FIGURE 2) of about 15° to the indexing axis, and the elliptical form of each groove is such as to produce a pressure angle D (see FIGURE 3) of approximately 60°. The pressure angle is as shown the angle subtended at the center of each ball 15 by the two areas A and B of pressure contact of that ball with the corresponding groove 12.

I claim:

1. A work holding fixture comprising a grooved member arranged coaxially with a ball cage member adapted to receive a workpiece, a plurality of balls engaging the corresponding grooves in the grooved member and retained in the cage member so that they are located axially of the latter, the balls being arranged to grip a surface of the workpiece and the grooves so formed that the longitudinal axes thereof lie on a conical surface coaxial with said members, and means to produce relative axial movement of said members so that the grooves engage the balls with a wedging action to urge them radially into gripping contact with the workpiece.

2. A work holding fixture according to claim 1, wherein the grooved member is internally grooved and forms an outer member arranged around the cage member whereby the balls can grip the outer surface of the workpiece.

3. A fixture according to claim 2, wherein the cage member has a central bore such that the workpiece is centered by the cage member when inserted therein before the balls exert a gripping action.

4. A fixture according to claim 1, wherein the grooves are of elliptical cross-sectional shape so that each ball has two areas of contact with the corresponding groove disposed respectively on the two flanks of the latter.

5. A fixture according to claim 4, wherein the pressure angle subtended by the two areas of contact at the center of the corresponding ball is of the order of 60°.

6. A fixture according to claim 1, wherein the longitudinal axis of each groove is inclined at an angle of the order of 15° to the central axis of the fixture.

7. A fixture according to claim 1, wherein power-operated means are provided to produce said relative axial movement of the grooved and cage members, the power-operated means comprising a fluid-operated piston and cylinder assembly, the piston and cylinder of the assembly being respectively connected to said members.

8. A fixture according to claim 1, mounted in an indexing head which can be turned to index the workpiece for successive machining operations.

9. A fixture according to claim 8, wherein the indexing head comprises coaxially arranged indexing and draw sleeves to the outer ends of which the fixture members are respectively attached, the indexing sleeve being axially fixed and said means for producing relative axial movement acting to displace the draw sleeve.

References Cited in the file of this patent
UNITED STATES PATENTS

| | | |
|---|---|---|
| 2,142,477 | Murden | Jan. 3, 1939 |
| 2,662,773 | Parsons | Dec. 15, 1953 |
| 2,926,020 | Dayton | Feb. 23, 1960 |
| 3,039,781 | Bilz | June 19, 1962 |